United States Patent [19]

Kanade et al.

[11] 4,427,880
[45] Jan. 24, 1984

[54] NON-CONTACT VISUAL PROXIMITY SENSING APPARATUS

[75] Inventors: Takeo Kanade; Haruhiko Asada, both of Pittsburgh, Pa.

[73] Assignee: Westinghouse Electric Corp., Pittsburgh, Pa.

[21] Appl. No.: 278,518

[22] Filed: Jun. 29, 1981

[51] Int. Cl.³ .............................................. G01B 11/24
[52] U.S. Cl. ................................. 250/222.1; 250/224; 250/578; 356/4; 356/376
[58] Field of Search ................ 250/222.1, 578, 223 R, 250/224; 356/375, 376, 1, 4

[56] References Cited

U.S. PATENT DOCUMENTS

| | | | |
|---|---|---|---|
| 3,491,240 | 1/1970 | Vyce | 356/4 |
| 3,520,607 | 7/1970 | Zoot | 356/376 X |
| 3,562,538 | 2/1971 | Mergler | 250/222.1 |
| 4,355,904 | 10/1982 | Balasubramanian | 356/4 X |

FOREIGN PATENT DOCUMENTS 2801329  7/1979  Fed. Rep. of Germany ...... 250/558

Primary Examiner—David C. Nelms
Assistant Examiner—Edward P. Westin
Attorney, Agent, or Firm—M. P. Lynch

[57] ABSTRACT

An array of light sources transmit a series of light beams onto an object and the reflected light beams are focussed on a light responsive transducer. The output signals of the transducer are processed to determine the location and orientation of the object. The location and orientation information in turn is available to control the operation of a tool or manipulator relative to the object.

11 Claims, 13 Drawing Figures

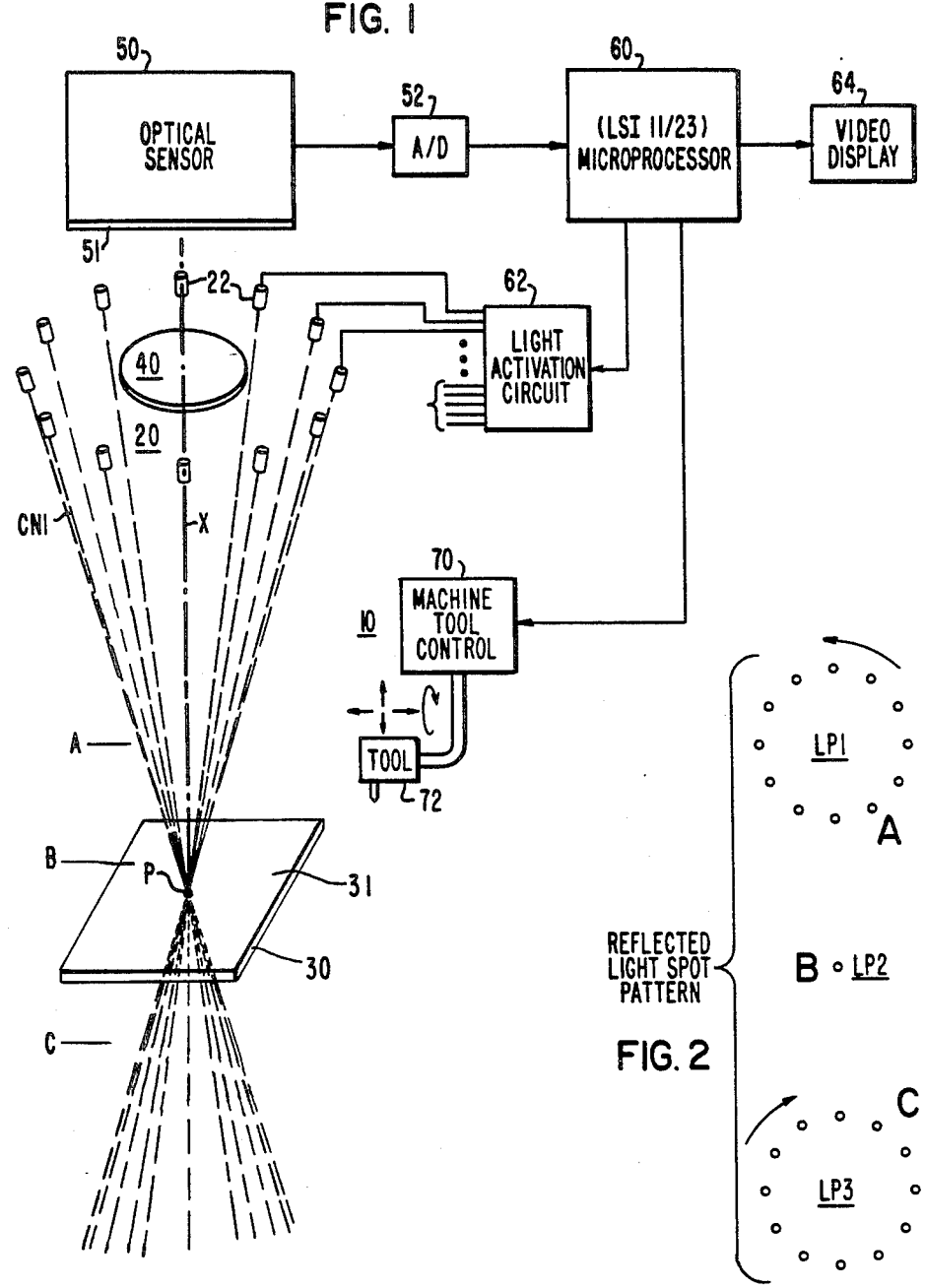

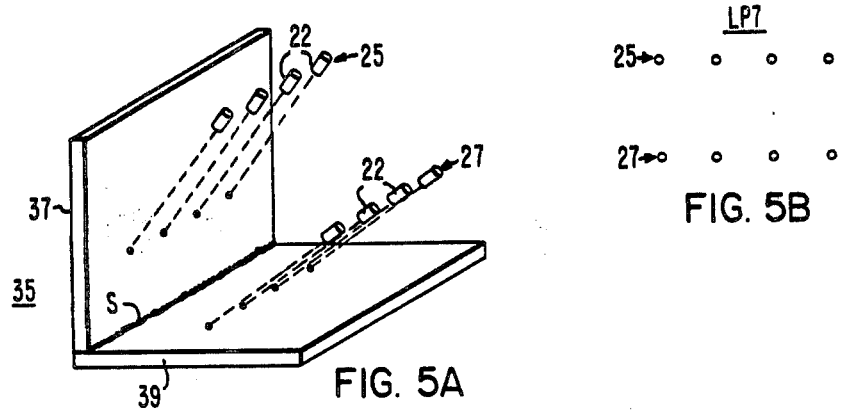
FIG. 5A
FIG. 5B
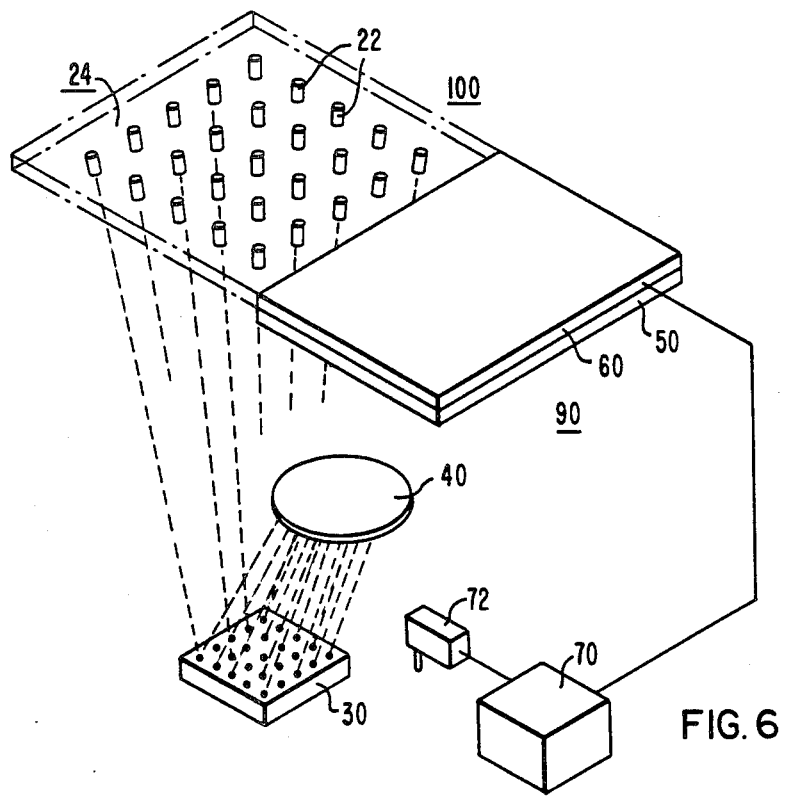
FIG. 6

NON-CONTACT VISUAL PROXIMITY SENSING APPARATUS

BACKGROUND OF THE INVENTION

The requirements for determining the location, orientation and surface curvature of an object are particularly evident in manufacturing and production operations wherein a workpiece or product undergoes a series of handling or processing steps. These requirements are especially critical when the various handling and process steps are the responsibility of machine tools, mechanical manipulators or robots. Typically, proximity sensing devices for monitoring a workpiece operate in either an on-off or continuous mode and can be classified as visual or non-visual, contact or non-contact, and long range or short range.

SUMMARY OF THE INVENTION

There is disclosed herein with reference to the accompanying drawings a visual, non-contact, proximity sensing technique which is capable of providing continous indications of distance, surface orientation and curvature of an object of interest. An array of discrete light-emitting sources transmit a series of light beams onto an object and the reflected light beams are focused on a light responsive transducer which provides information indicative of the orientation, curvature and location of the object. A single light source position sensor identified as the Optocator is commercially available from Selective Electronics, Inc.

BRIEF DESCRIPTION OF THE DRAWINGS

The invention will become more readily apparent from the following exemplary description in connection with the accompanying drawings:

FIG. 1 is a schematic implementation of a proximity sensing apparatus in accordance with the invention;

FIGS. 2A, 2B and 2C are illustrations of the reflected light beam pattern from an object positioned at three different positions relative to the sensing apparatus of FIG. 1;

FIGS. 4, 4A, 4B, 4C, 5A and 5B are illustrations of alternative light source arrays; and FIG. 6 is an alternative embodiment of the inventive concept of FIG. 1.

DESCRIPTION OF THE PREFERRED EMBODIMENT

Figure 3A:
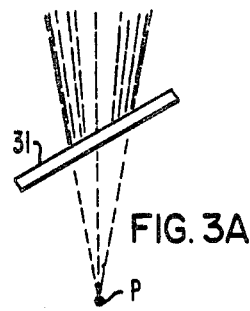
FIGS. 3A and 3B illustrate an alternate orientation of the object of FIG. 1.

Referring to FIG. 1 there is schematically illustrated a visual sensing apparatus 10 including an array 20 of discrete light sources 22 for directing light beams onto an object 30. Imaging optics 40 focus the reflected light beams from the object 30 onto a light responsive transducer 50 with appropriate magnification. The transducer 50 develops analog signals indicative of the location of impinging light beams on the light sensitive surface 51. The analog to digital converter circuit 52 converts the analog signal of the transducer 50 to a digital signal which is supplied as an input signal to a microprocessor circuit 60. The microprocessor circuit 60, which may typically consist of a Digital Equipment Corporation Type LSI11/23, determines the location and orientation of the object 30 on the basis of the signal information from the transducer 50. The microprocessor 70 in turn controls the operation of the tool 72 via the machine tool control circuit 70 to maintain a desired working relationship between the tool 72 and the object 30. The tool 72 may typically perform a welding, cutting, scribing, etc. operation, or it may consist of a gripper associated with a manipulator used in an assembly or process control system. The object location and orientation information developed by the microprocessor circuit 60 can also be visually presented on the video dislay 64.

In the embodiment of the sensing apparatus 10 of FIG. 1, the light-emitting sources 22, which may be suitably implemented through the use of light-emitting diodes, laser sources, etc., are positioned in a circular array 20 and disposed to develop a conical light pattern CN1 comprised of discrete line light beams converging at a predetermined point P corresponding to the tip of a light cone CN1. The light cone CN1 has an axis X passing through the imaging optics 40 and perpendicular to the light sensitive surface 51. The activation of the light sources 22 is controlled by the light activation circuit 62 which responds to a light activation program stored in the microprocessor circuit 60.

It is assumed, for the purposes of discussion, that the object 30 is a flat plate and the surface 31 of the flat plate 30 is perpendicular to the axis X of the conical light pattern CN1. If the object 30 is located at position B as shown, such that the surface 31 intersects the point P, the light spots focused on the light responsive transducer 50 by the imaging optics 40 would be a single spot light pattern LP2 as illustrated in FIG. 2B. If the object 30 is located at position A of FIG. 1 or position C of FIG. 1, the light spot patterns focused on the light responsive transducer 50 by the imaging optics 40 would be circular patterns LP1 and LP3 of FIGS. 2A and 2C, respectively.

Figure 3B:
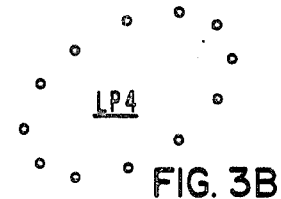

The circular pattern of reflected light beams are present only if the flat surface 31 of the object 30 remains perpendicular to the axis X of the conical light pattern CN1. If the object 30 is other than perpendicular, as illustrated in FIG. 3A, the light spot pattern LP4 focused on the transducer 50 would no longer be a circle but in the case of a flat surface 31 would be an ellipse as illustrated in FIG. 3B. The principal axes of the ellipse determine the orientation of the object 30.

Thus far no provision has been made to determine if the circular pattern of light spots corresponding to FIGS. 2A and 2C are the result of the object 30 being at position A or C of FIG. 1. In order to distinguish between object locations on either side of the converging point P, the light-emitting sources 22 are activated sequentially by the light source activation circuit 62 in response to the stored program in the microprocessor circuit 70. The light source activation circuit 62 can be suitably implemented through a series of driver circuits each associated with a light source 22, and responsive to the light source activation pattern developed by the microprocessor circuit 70. No more than one light source 22 is activated at any one time. Thus, the sequence of individual reflected light beams monitored by the transducer 50 in response to the object 30 located at position A of FIG. 1 will produce a light spot pattern LP1 wherein the light spots occur in a sequential pattern, i.e., clockwise or counterclockwise, identical to the activation direction, clockwise or counterclockwise, of the light sources 22. In the event the object 30 is at position C, i.e., beyond the point P, the series of reflected light beams monitored by the transducer 50 will produce a light spot pattern LP3 which is phase shifted 180° with respect to the activation of the light sources 22. Thus, the apparatus 10 provides a capability of determining the orientation of the object 30 on the basis of the pattern of the light spots, i.e., circular, elliptical, etc., focused on the transducer 50 by the optics 40. The direction of the sequential occurrence of the reflected light beams focused on the transducer 50 determines the position of the object 30 with respect to the converging point P. The specific location of the object 30 is determined on the basis of the perimeter of the light spot pattern sensed by the transducer 50. The perimeter of a light spot optical pattern corresponding to an object positioned close to the point P will be relatively small while the perimeter of a light spot pattern corresponding to an object location further from the focal point P will be proportionally greater. For instance, when the pattern of light spots is a circle, as illustrated in FIGS. 2A and 2C, the radius of the circle is proportional to the distance of the surface 31 of the object 30 from the point P.

The surface reflectivity characteristic of the object 30 can also be monitored on the basis of the current level of the signal generated by the transducer 50 in response to a reflected light beam. The value of the current signal is a function of the intensity of the reflected light beams.

Since the direction of the light beam from each of the sources 22 is preset by the positioning of the light sources 22 in the array 20 and the line of view to the spot the reflected light beam contacts the transducer 50 from the object 30 are both known at a given time, the position of the spot on the surface of the object from which the light is being reflected can be calculated by the microprocessor circuit 70 by the principle of triangulation.

While the light responsive transducer 50 can be implemented through the use of a television camera in combination with a signal processor, an analog position sensor chip comprised of planar-type PIN photodiodes, such as is commercially available as type S1300 from Hamamatsu Television Company Ltd., is preferred. This commercially available chip develops output current signals which are readily processed by the microprocessor circuit 70 to determine where each of the reflected light beams impinge on the surface 51 of the transducer 50. The sensitivity of this commercially available analog position sensor chip is such that focussing of the reflected light beams by the optics 40 is less critical.

In an implementation of the apparatus 10 utilizing the above-identified commercially available position sensor chip from Hamamatsu Ltd., the light-emitting sources 22 consist of infrared light-emitting diodes having a wavelength in a range of between 800 nanometers and 1,000 nanometers.

While a single circular array 20 of light sources 22 has been illustrated in FIG. 1 other arrays can be employed to meet different object configurations.

Figure 4A:
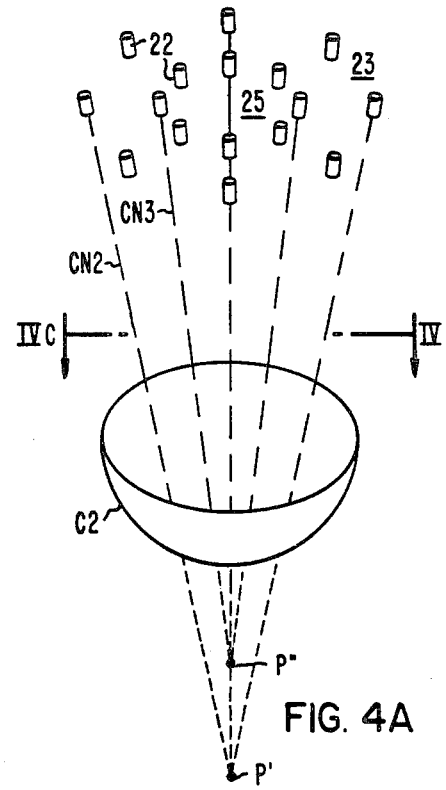
Figure 4:
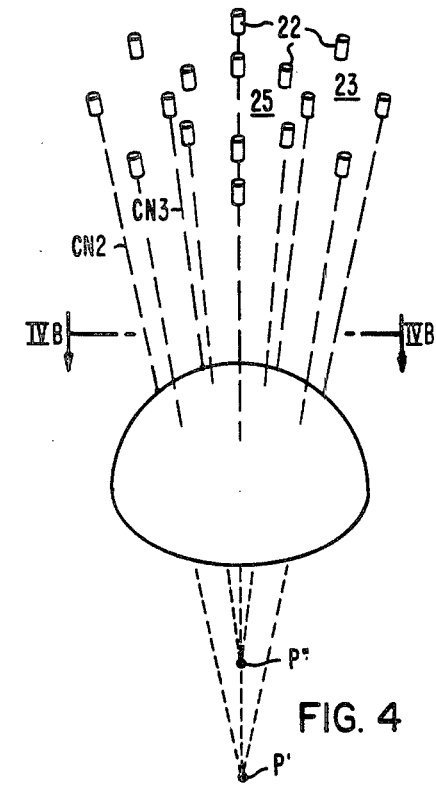
Figure 4C:
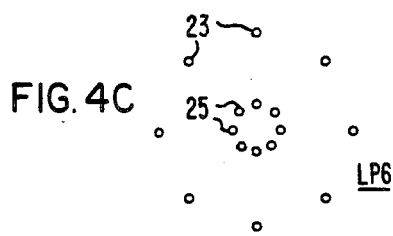
Figure 4B:
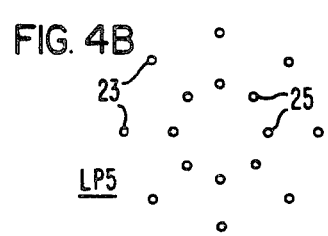

Concentric circular arrays 23 and 25, each with different converging points P' and P'', as depicted in FIGS. 4 and 4A can be employed to measure object curvature as illustrated in the light spot patterns LP5 and LP6 of FIGS. 4B and 4C respectively.

It is apparent from FIGS. 4 and 4A that the arrangement of opposite curved surfaces C1 and C2 would produce the same light spot pattern if only the outer circular light source array 23 was employed. The inner circular light source array 25 provides a differentiation between the curved surfaces C1 and C2 as is apparent from the light spot patterns of FIGS. 4B and 4C developed by the conical light patterns CN2 and CN3.

Parallel line arrays 25 and 27 of light sources 22 provide a configuration for monitoring the location and orientation of an edge or corner seam S of an object 35 typically illustrated in FIG. 5A as consisting of plates 37 and 39. The reflected light beams from the object 35 in response to the sequential actuation of the light sources 22 will produce a light spot pattern LP7 of FIG. 5B. The linear light spot patterns associated with the line arrays 25 and 27 will be parallel if the distance between the light sources 22 and the surfaces of the plates 37 and 39 are equal. The object location and orientation information supplied to the microprocessor 70 by the transducer 50 in response to the reflected light beams from the object 35 can be utilized to position the tool 72 with respect to the object 35, or to position the object 35 with respect to the tool 72.

In FIG. 6, a general purpose X-Y array 24 of light sources 22 can be employed with a large scale integrated chip 90 embodiment of the transducer 50, converter 52, microprocessor circuit 60 and light activation circuit 62 to form a compact, general purpose non-contact proximity sensing device 100. The X-Y array 24 would permit the selection of a variety of squential light beam patterns as dictated by the microprocessor circuit for a given object configuration.

We claim:

1. Apparatus for determining the location and orientation of an object, comprising:
   a plurality of light sources disposed in spaced apart relationship from said object,
   a light source activation means operatively connected to said plurality of light sources to sequentially activate said light sources causing a series of light beams to impinge on said object,
   light responsive transducer means having a two dimensional light sensitive area positioned relative to said object to receive the reflected light beams from said object and develop output signals in response to each of said reflected light beams, each of said output signals being indicative of the location on said light sensitive area contacted by the respective reflected light beams; and
   signal processing means responding to said output signals by identifying a pattern of output signals and determining therefrom the location and orientation of said object.

2. Apparatus as claimed in claim 1 further including focusing means disposed between said object and said light responsive transducer means to focus said reflected light beams onto said light responsive transducer means.

3. Apparatus as claimed in claim 1 wherein said plurality of light sources comprises a circular array positioned to cause the sequential light beams developed by said light sources to form a conical light beam pattern having an axis which is perpendicular to the light sensitive area of the light responsive transducer.

4. Apparatus as claimed in claim 1 wherein the magnitude of the output signals developed by said light responsive transducer means is indicative of the reflectivity characteristics of the surface of said object.

5. Apparatus as claimed in claim 1 wherein said signal processing means includes a microprocessor circuit means having a stored program for controlling the operation of said light source activation means to cause the sequential actuation of said plurality of light sources in accordance with said stored program such that no more than one light source is activated at a given time, said microprocessor circuit means responding to the output signals developed by said light responsive transducer means by developing signals indicative of the location and orientation of said object.

6. Apparatus as claimed in claim 1 further including tool means operatively associated with said object, said signal processing means controlling the relative positioning of said tool means and said object in response to the location and orientation of said object.

7. Apparatus as claimed in claim 1 wherein said plurality of light sources comprise a circular array positioned to cause the sequential light beams developed by said light sources to form a conical light beam pattern.

8. Apparatus as claimed in claim 1 wherein said plurality of light sources comprise concentric first and second circular arrays, each circular array including light sources positioned to cause the sequential light beams developed by the respective light sources of each circular array to form concentric conical light beam patterns about a common axis.

9. Apparatus as claimed in claim 1 wherein said plurality of light sources comprise an array of at least two parallel rows of light sources.

10. Apparatus as claimed in claim 1 wherein said plurality of light sources comprise a two dimensional array of light sources, said light source activation means sequentially activating a predetermined arrangement of said light sources.

11. Apparatus as claimed in claim 1 wherein said light sources are infrared light emitting diodes having a wavelength in a range of between about 800 nanometers and about 1,000 nanometers.

* * * * *